United States Patent
Chao et al.

[19]

[11] Patent Number: 6,047,026

[45] Date of Patent: Apr. 4, 2000

[54] METHOD AND APPARATUS FOR AUTOMATIC EQUALIZATION OF VERY HIGH FREQUENCY MULTILEVEL AND BASEBAND CODES USING A HIGH SPEED ANALOG DECISION FEEDBACK EQUALIZER

[75] Inventors: Emil Yu-Ming Chao, Orange; Nirav Pravinkumar Dagli, Tustin; Parameswaran Gopal Iyer, Rancho Santa Margarita; Alarabi Omar Hassen, Santa Ana, all of Calif.

[73] Assignee: OHM Technologies International, LLC, Irvine, Calif.

[21] Appl. No.: 08/940,047

[22] Filed: Sep. 30, 1997

[51] Int. Cl.$^7$ .............................. H03H 7/30; H03H 7/40
[52] U.S. Cl. ...................... 375/233; 375/236; 708/323
[58] Field of Search .................... 375/233, 236; 708/322, 323

[56] References Cited

U.S. PATENT DOCUMENTS

| | | | |
|---|---|---|---|
| 5,142,552 | 8/1992 | Tzeng et al. ............................ | 375/232 |
| 5,381,359 | 1/1995 | Abbott et al. .......................... | 708/322 |
| 5,550,596 | 8/1996 | Strolle et al. .......................... | 348/607 |
| 5,822,143 | 10/1998 | Cloke et al. ............................ | 360/65 |

*Primary Examiner*—Don N. Vo
*Assistant Examiner*—Phuong Phu
*Attorney, Agent, or Firm*—Lyon & Lyon LLP

[57] ABSTRACT

A decision feedback equalizer circuit employing a current mode finite impulse response (FIR) filter. A decision feedback equalizer circuit comprises an attenuator block for scaling a received voltage signal, a first transconductor (voltage-to-current converter) for converting the received voltage signal to a current signal, a current mode finite impulse response (FIR) filter for adding or subtracting current increments from the current signal and generating an equalized current signal, a second transconductor (current-to-voltage converter) for converting the equalized current signal into an equalized voltage signal, a positive slicer block for determining when the equalized voltage signal achieves a positive threshold level, a negative slicer block for determining when the equalized voltage signal achieves a negative threshold level, and a plurality of delay lines coupled respectively to the slicer blocks and to the current mode FIR filter for providing tap enable signals to the current mode FIR filter in response to signals received from the slicers. The decision feedback equalizer circuit may further comprise a baseline wander correction block for providing a correction current to the current mode FIR filter to compensate for baseline wander in the input voltage signal, and an adaptation block for providing compensation signals to the current mode FIR filter to insure that the equalized voltage signal conforms to a predetermined format.

23 Claims, 11 Drawing Sheets

METHOD AND APPARATUS FOR AUTOMATIC EQUALIZATION OF VERY HIGH FREQUENCY MULTILEVEL AND BASEBAND CODES USING A HIGH SPEED ANALOG DECISION FEEDBACK EQUALIZER

BACKGROUND OF THE INVENTION

The field of the present invention is digital signal processing systems and, more particularly, decision feedback equalizer circuits for use in such systems.

Recently, substantial attention has been directed toward the development of local and wide area networks and communications systems that use multilevel pulse signaling schemes. These networks generally employ receiver circuits having a baseband equalization capability. Stated somewhat differently, for receiver circuits to consistently decipher high, low and intermediate pulses representing data symbols, it is necessary for those circuits to equalize or compensate for transmission loss and phase distortion within the baseband signal. One of the most common forms of noise that must be removed from received baseband signals is generally referred to as intersymbol interference (ISI) and results from the variable low pass characteristics of the transmission media (generally, a twisted pair of cable).

Figure 1:
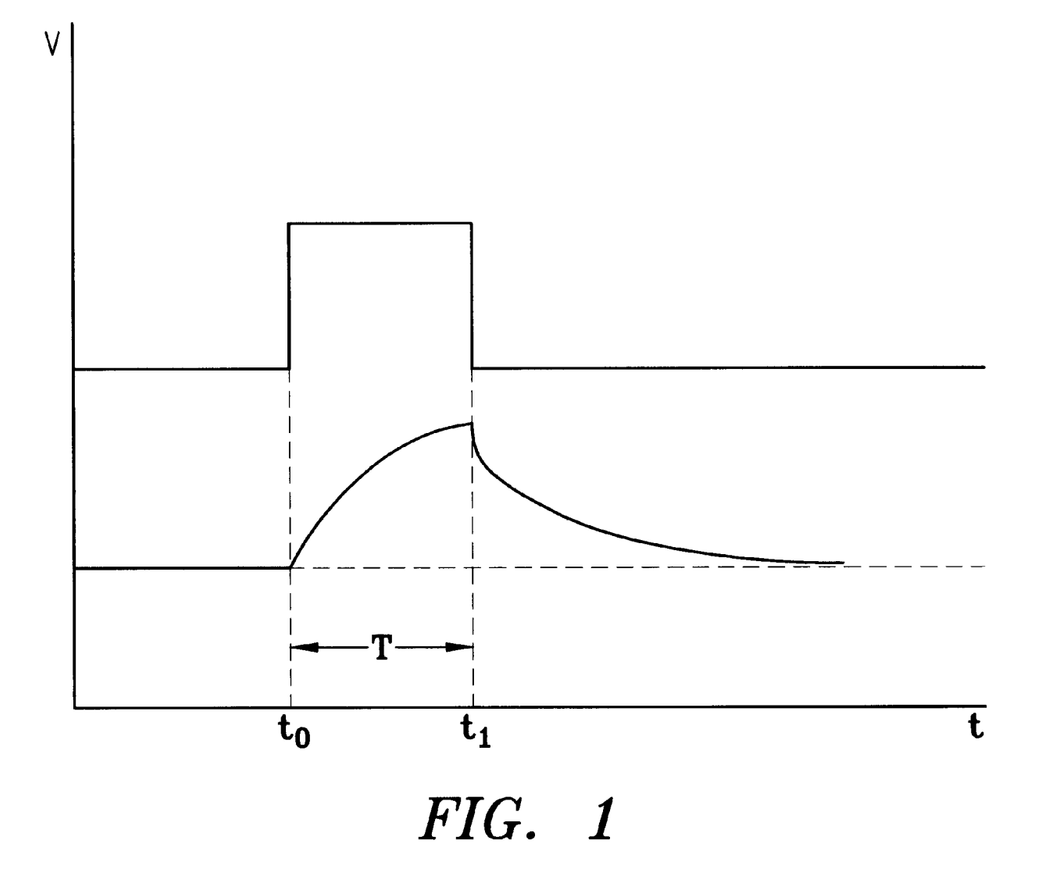
FIG. 1 is a timing diagram illustrating a typical baseband pulse having the form of a square wave and a waveform that may result when the baseband pulse is transformed by a low pass filter or low pass transmission network.

As shown in FIG. 1, a baseband square wave pulse that is passed through a low pass filter or low pass transmission network may be substantially altered, disfigured and/or re-shaped due to the resistive, capacitive and inductive nature of a low pass transmission system. In short, the generated baseband square wave is transformed into a signal that rises to a peak value during the period T of the square wave and then gradually decreases or "tails off" to some reduced level in the period following the falling edge of the baseband square wave signal. Not surprisingly, the tail portion of the transformed signal may cause substantial interference or noise to be found in later received signals. Indeed, the tail portion of the transformed signal is one of the principal causes of post cursor intersymbol interference (ISI). Digital decision feedback equalizer circuits have been known to compensate for such post cursor intersymbol interference, and have proven to be an integral part of modern broad band communication receivers. However, despite the fact that digital decision feedback equalizer circuits have been used extensively in modems and other forms of broadband receivers, their use in very high frequency or high speed baseband multilevel receivers has been extremely sparse. This is primarily due to the fact that conventional digital signal processing techniques rely on at least a two times (2x) oversampling of analog baseband waveforms to gather sufficient quantized information to perform equalization in the digital domain. This, however, becomes an extremely complex and, indeed, prohibitive process when the baseband signaling rate calls for pulse widths in the range of 10 nanoseconds and below. Stated somewhat differently, there is simply too little time available to perform digital decision feedback equalization functions where the baseband signaling rate calls for pulse widths in the range of 10 nanoseconds and below.

Accordingly, it is respectfully submitted that those skilled in the art would find a decision feedback equalizer circuit capable of functioning at baseband frequencies wherein the pulse widths of the transmitted signals are less than or equal to 10 nanoseconds to be quite useful.

SUMMARY OF THE INVENTION

In one innovative aspect, the present invention is directed toward an improved decision feedback equalizer circuit that is implemented using an analog, current mode, finite impulse response (FIR) filter, and is capable of handling pulse widths below 10 nanoseconds.

In one preferred embodiment, a decision feedback equalizer circuit in accordance with the present invention may comprise an attenuator block for scaling a received voltage signal, a first transconductor (voltage-to-current converter) for converting the received voltage signal to a current signal, a current mode finite impulse response (FIR) filter for adding or subtracting current increments from the current signal and generating an equalized current signal, a second transconductor (current-to-voltage converter) for converting the equalized current signal into an equalized voltage signal, a positive slicer block for determining when the equalized voltage signal achieves a first positive threshold level, a negative slicer block for determining when the equalized voltage signal achieves a second negative threshold level, and a plurality of delay lines coupled respectively to the slicer blocks and to the current mode FIR filter for providing tap enable signals to the current mode FIR filter in response to signals received from the positive and negative slicer blocks. In addition, a decision feedback equalizer circuit in accordance with the present invention may comprise a baseline wander correction block for providing a correction current to the current mode FIR filter to compensate for baseline wander in the input voltage signal and an adaptation block for providing compensation signals to the current mode FIR filter to insure that the equalized voltage signal conforms to a predetermined format.

The basic operation of a decision feedback equalizer circuit in accordance with the present invention may be described as follows. The input baseband waveform is converted to a current signal via an input transconductor, and intersymbol interference (ISI) resulting, for example, from the variable low pass characteristics of the transmission media is removed from the converted current signal through the use of a finite impulse response (FIR) filter which includes a plurality quantized current sources for either adding or subtracting current increments to/from the converted current signal to produce an equalized current signal. The equalized current signal is converted to an equalized voltage signal by a second transconductor, and the equalized voltage signal is delivered to a positive/negative slicer network. The positive/negative slicer network monitors the equalized voltage signal to determine when the equalized voltage signal achieves positive and negative threshold levels. Upon detecting that the equalized voltage signal has achieved a positive or negative threshold level, the positive/ negative slicer network provides a programmably determinable number of tap enable signals to the quantized current sources of the FIR filter via a delay network. This enables the FIR filter to remove intersymbol interference (ISI) from the initially converted current signal in real time and at very high frequencies and/or transmission rates.

Accordingly, it is an object of the present invention to provide an improved decision feedback equalizer circuit for use in signal processing systems including local and wide area networks.

It is another object of the present invention to provide a decision feedback equalizer circuit that operates primarily in a current mode and enables transmission pulse widths less than or equal to ten (10) nanoseconds.

Other objects and features of the present invention will become apparent from consideration of the following description taken in conjunction with the accompanying drawings.

DETAILED DESCRIPTION OF PREFERRED EMBODIMENTS

In an effort to highlight various embodiments and innovative aspects of the present invention, a number of sub-headings are provided in the following discussion. In addition, where a given structure appears in several drawings, that structure is labeled using the same reference numeral in each drawing.

Figure 2:
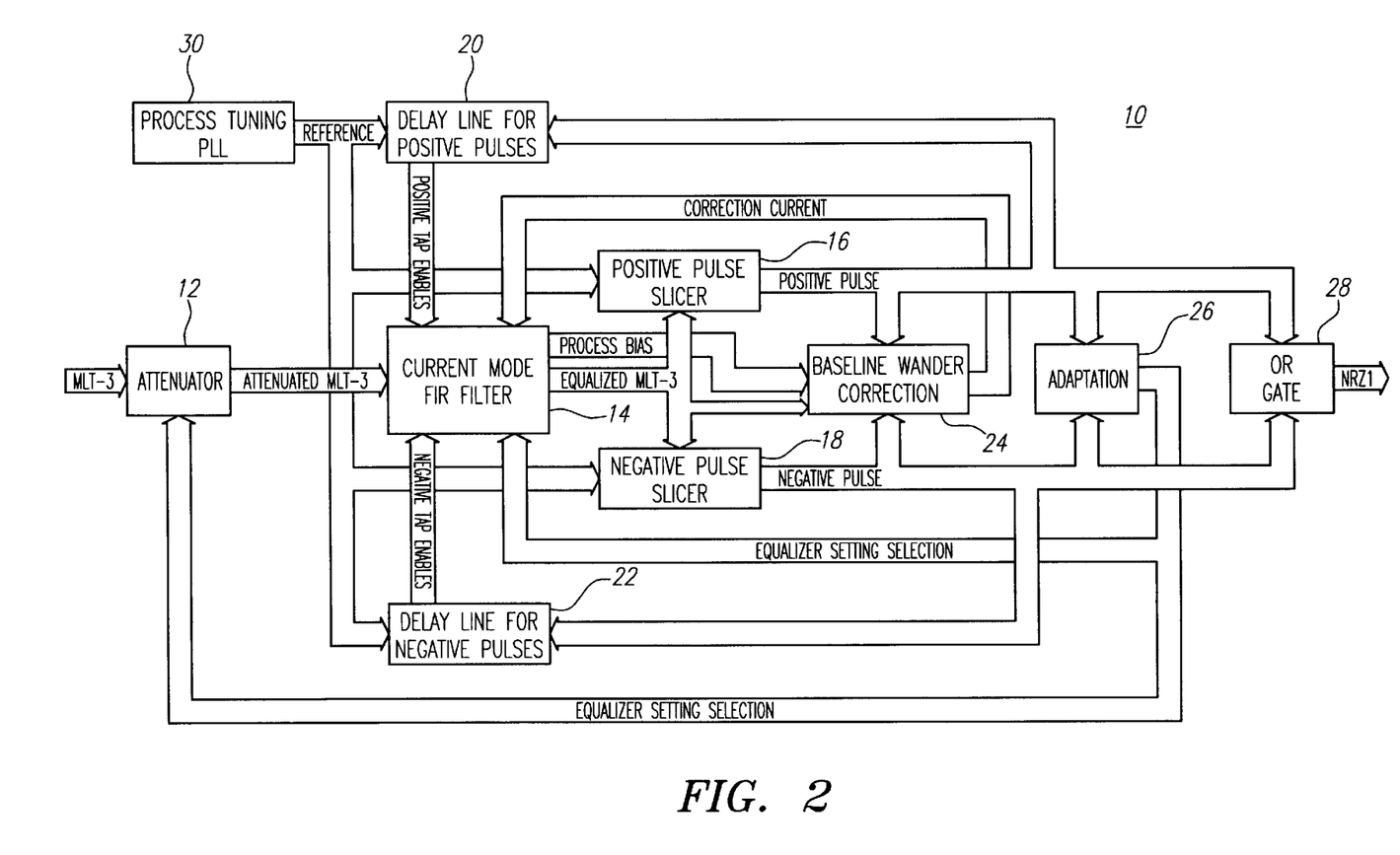
FIG. 2 is a block diagram illustrating the components of a decision feedback equalizer circuit in accordance with one form of the present invention.

General Description—Structure and Operation of the Decision Feedback Equalizer Circuit Turning now to the drawings, as shown in FIG. 2, an exemplary decision feedback equalizer circuit 10 in accordance with the present invention may comprise an attenuator 12, a current mode finite impulse response (FIR) filter 14, a positive slicer 16, a negative slicer 18, a positive pulse delay line 20, a negative pulse delay line 22, a baseline wander correction block 24, an adaptation block 26, an OR gate 28, and a process tuning phase-lock-loop block 30. Each of the components comprised in the decision feedback equalizer circuit 10 will be discussed in some detail below. However, the general theory of operation of a decision feedback equalizer circuit 10 in accordance with the present invention may be described as follows.

The decision feedback equalizer circuit 10 is implemented using an analog current mode finite impulse response (FIR) filter 14. An input voltage baseband waveform Vin is provided to and scaled by the attenuator block 12, so that the input voltage Vin remains within the linear operating range of the FIR filter 14. Thereafter, the input voltage waveform Vin is provided to an input stage of the current mode FIR filter 14. The input stage of the current mode FIR filter 14 comprises a first transconductor (voltage-to-current converter) 32 which converts the received scaled input signal Vin to a current signal Iin. The output stage of the current mode FIR filter 14 comprises a second transconductor (curent-to-voltage converter) 34 that provides an equalized voltage signal $V_{Eq}$ to the positive and negative slicers 16 and 18. The equalized voltage waveform $V_{Eq}$ triggers the positive slicer 16 if it achieves a predetermined positive slicer threshold level, indicating that a "1" has been received by the decision feedback equalizer circuit 10, and triggers the negative slicer 18 if it achieves a predetermined negative slicer threshold level, indicating that a "−1" has been received. Where the positive slicer 16 is triggered, the "1" logic signal is launched down a positive delay line 20 which, in turn, generates N tap enable signals in a predetermined and programmably controllable sequence, generally one bit time apart. Similarly, where the negative slicer 18 is triggered, the "−1" logic signal is launched down a negative delay line 22 which, in turn, generates N tap enable signals in a predetermined and programmably controllable sequence, generally one bit time apart. The tap enable signals are provided to a series of switches 36a–t, which turn on quantized differential current sources (shown in FIG. 3(b)) that add positive and negative current increments to the converted current signal Iin to remove intersymbol interference (ISI). When the positive slicer 16 is triggered, negative current increments are added to the converted current signal Iin and, conversely, when the negative slicer 18 is triggered, positive current increments are added to the converted current signal Iin. In this fashion, the pulse tail(s) resulting from the low pass characteristics of the transmission media are removed from the converted current signal Iin. Further, it will be noted that the equalization process is continued for the duration of the tail of each received pulse. Stated somewhat differently, though the addition of positive and negative current increments to the converted current signal Iin, an equalized current signal $I_{Eq}$ is generated. The equalized current signal $I_{Eq}$ may then be converted into an equalized voltage signal $V_{Eq}$. Ideally, the subtraction of the ISI produces a pulse at the output of the slicer that is very close to a unit bit time.

Implementation of the Attenuator Block

The attenuator block is fully differential, and is digitally controlled to select varying levels of attenuation. The attenuation is implemented using an on chip resistor divider network, that is connected to an analog multiplexer with digital control. In the embodiment shown in FIG. 2, the output of adaptation block 26 is provided to the attenuator 12. Those skilled in the art will appreciate that the structure and operation of attenuation circuits is well known in the art. Thus, the structure and operation of such circuits are not described herein.

Implementation of the Current Mode Finite Impulse Response (FIR) Filter

Figure 3A:
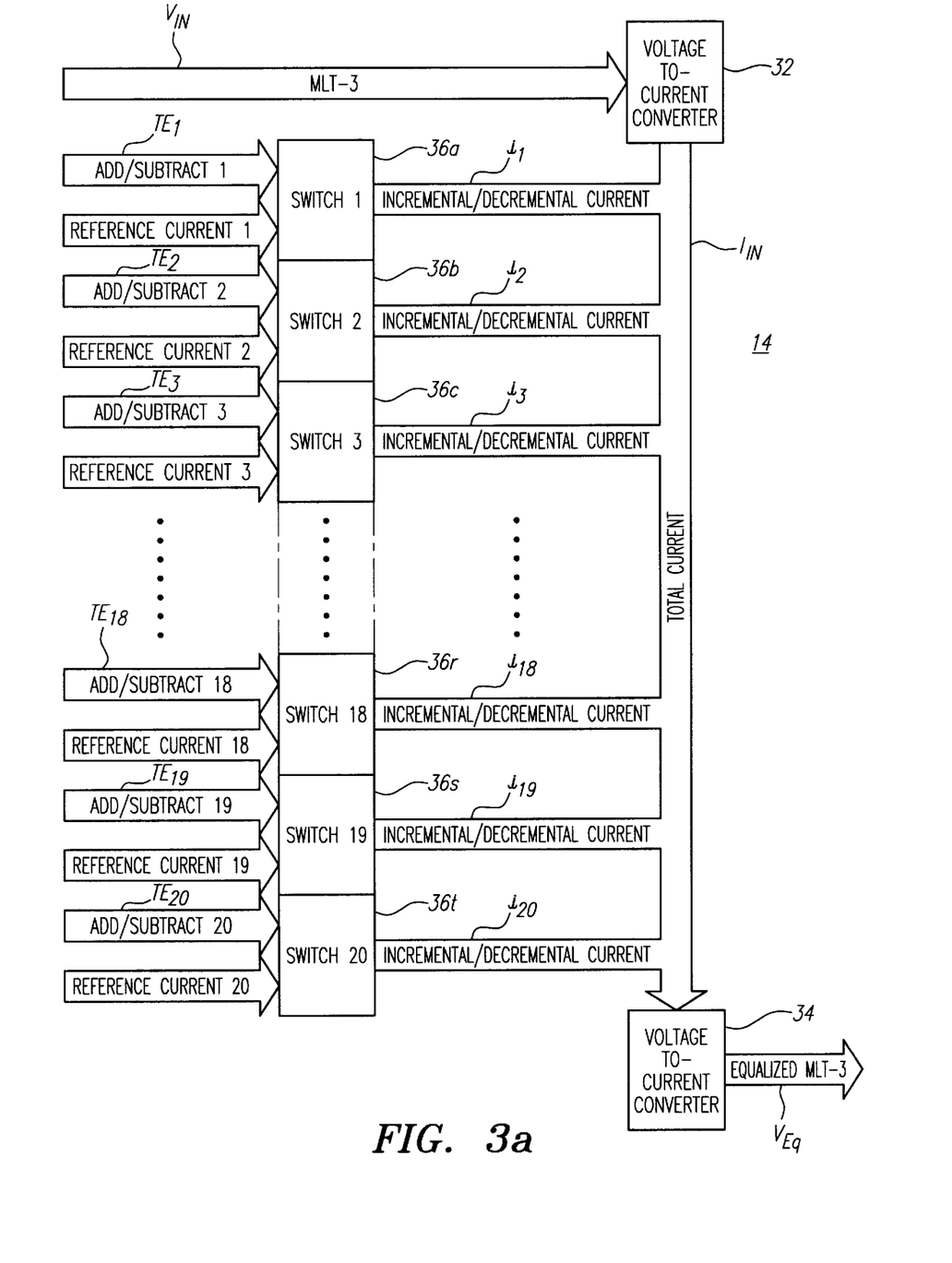
FIG. 3(a) is a block diagram illustrating the components of a current mode finite impulse response (FIR) filter in accordance with the present invention.
Figure 3B:
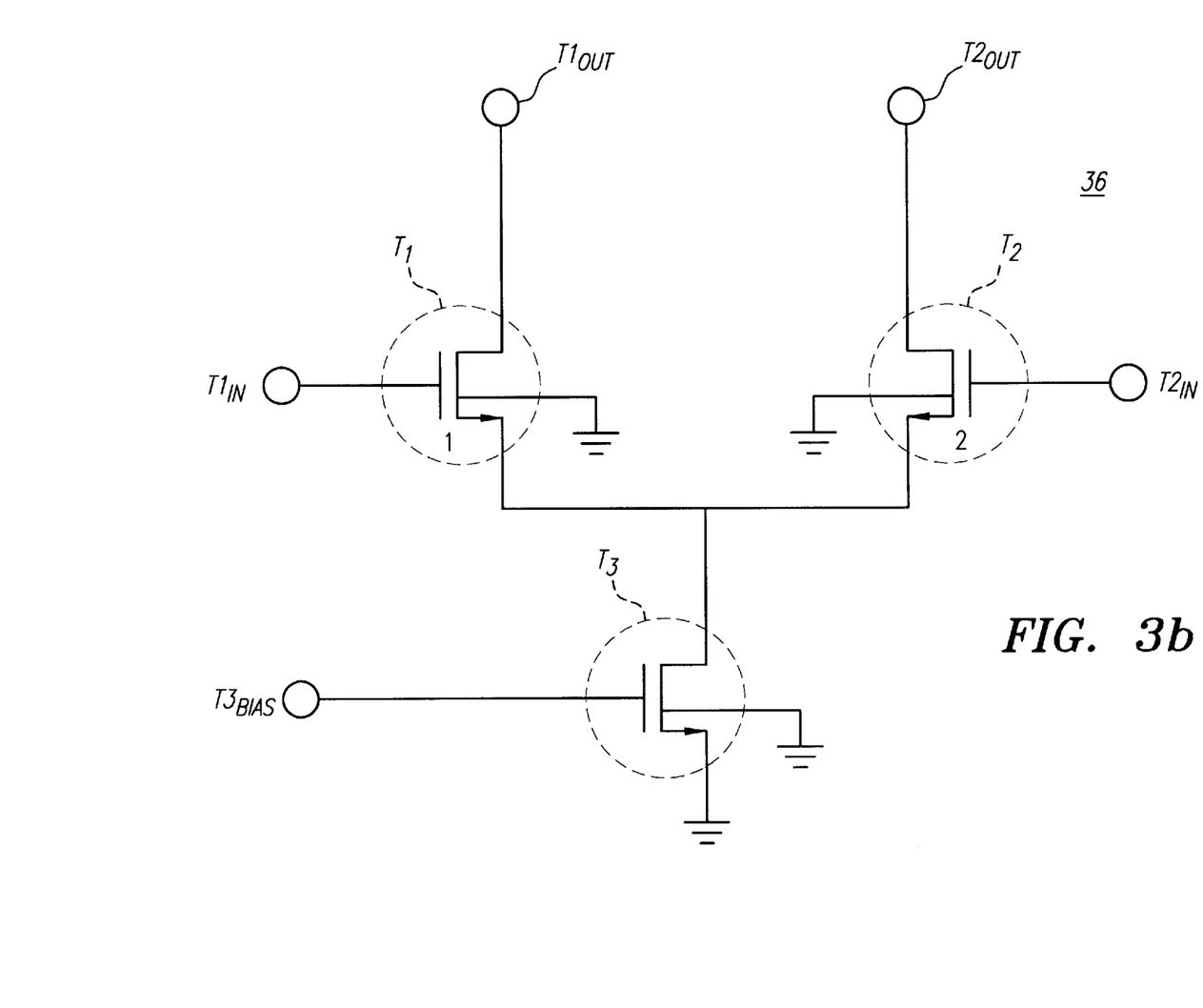
FIG. 3(b) is a circuit diagram of a switched differential current source in accordance with the present invention.

Turning now to FIGS. 3(a) and 3(b), in a preferred form, the current mode finite response (FIR) filter 14 comprises a first transconductor (voltage-to-current converter) 32, a second transconductor (current-to-voltage converter) 34, and twenty (20) switched differential current sources 36a–t that are responsive to positive and negative tap enable signals $TE_1$–$TE_{20}$ provided by the delay lines 20 and 22. The twenty switched differential current sources 36a–t function to add positive and negative current increments to the converted input current signal Iin to eliminate ISI from that signal.

In a preferred embodiment, shown in FIG. 3(b), each of the switched differential current sources 36a–t comprises three (3) transistors T1, T2 and T3. Transistors T1 and T2 form a switching element, while transistor T3 serves as a current source. When transistor T1 is switched "on," i.e., when the gate-to-source voltage (Vgs) is maximum, all of the current provided by the current source 20 is allowed to flow through transistor T1. Similarly, When transistor T2 is switched "on," all of the current provided by the current source is allowed to flow through transistor T2. The polarity of the differential voltage at the outputs of the transistors T1 and T2 determines the "add/subtract" operation of the switched differential current source 36a–t. For example, if both switches are on, an equal amount of current flows through both transistors, and the difference voltage between the nodes T1out and T2out is zero (0). If all of the current flows through transistor T1, a net positive voltage develops between the nodes T1out and T2out that is equal to the source current multiplied by the resistance present at the respective nodes. In contrast, if all of the current flows through transistor T2, a net negative voltage develops between the nodes T1 out and T2out that is equal to the source current multiplied by the resistance present at the respective nodes. Thus, the process of switching current between the two transistor branches (T1 and T2) serves as a means to "add" and "subtract" signals in the current domain.

Implementation of the Slicer Blocks

Figure 4A:
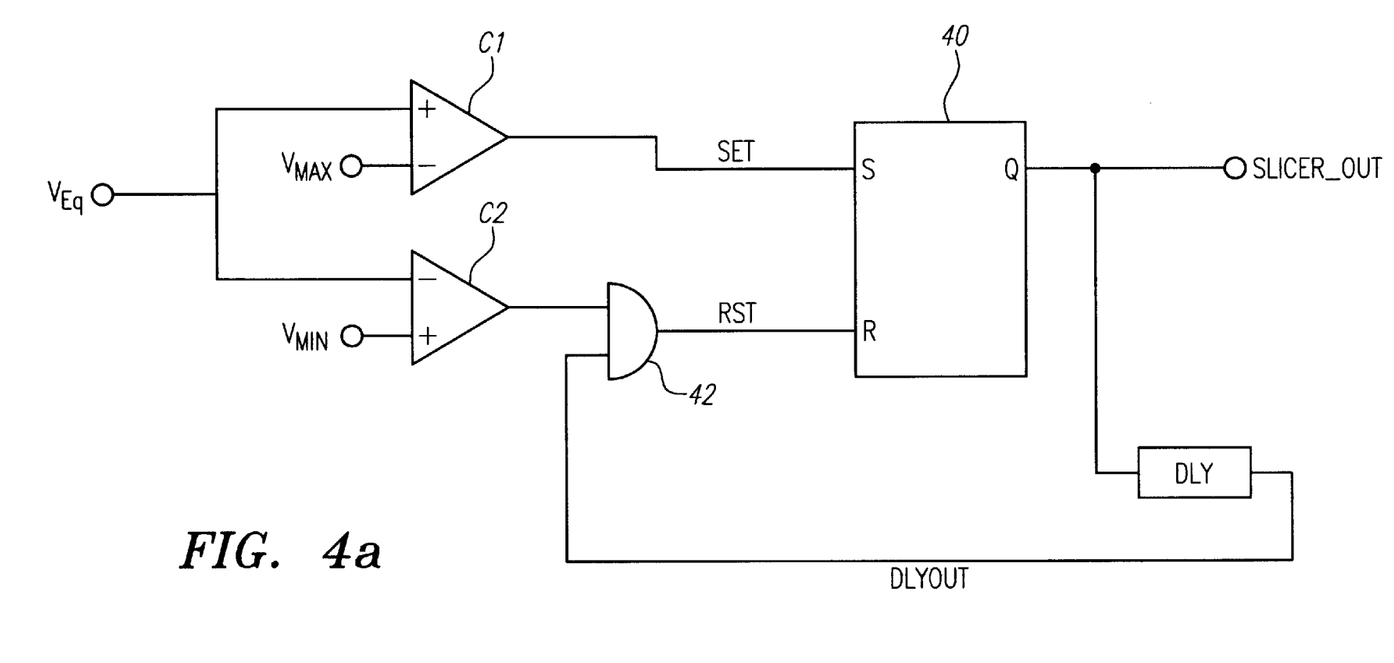
FIG. 4(a) is a block diagram illustrating the components of a positive/negative pulse slicer in accordance with one form of the present invention.
Figure 4B:
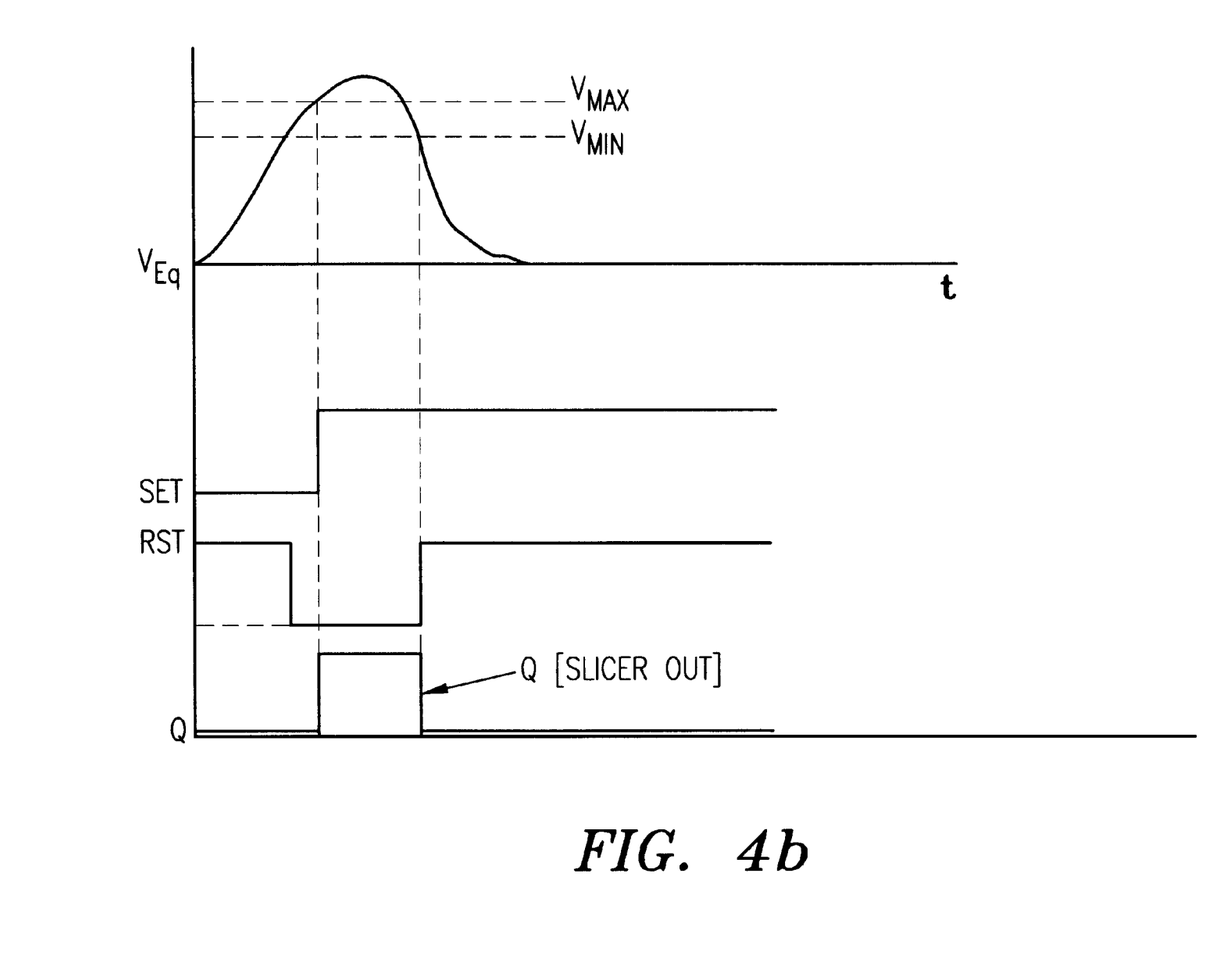
FIG. 4(b) is a timing diagram illustrating the general function of a positive/negative pulse slicer in accordance with the present invention.
Figure 4C:
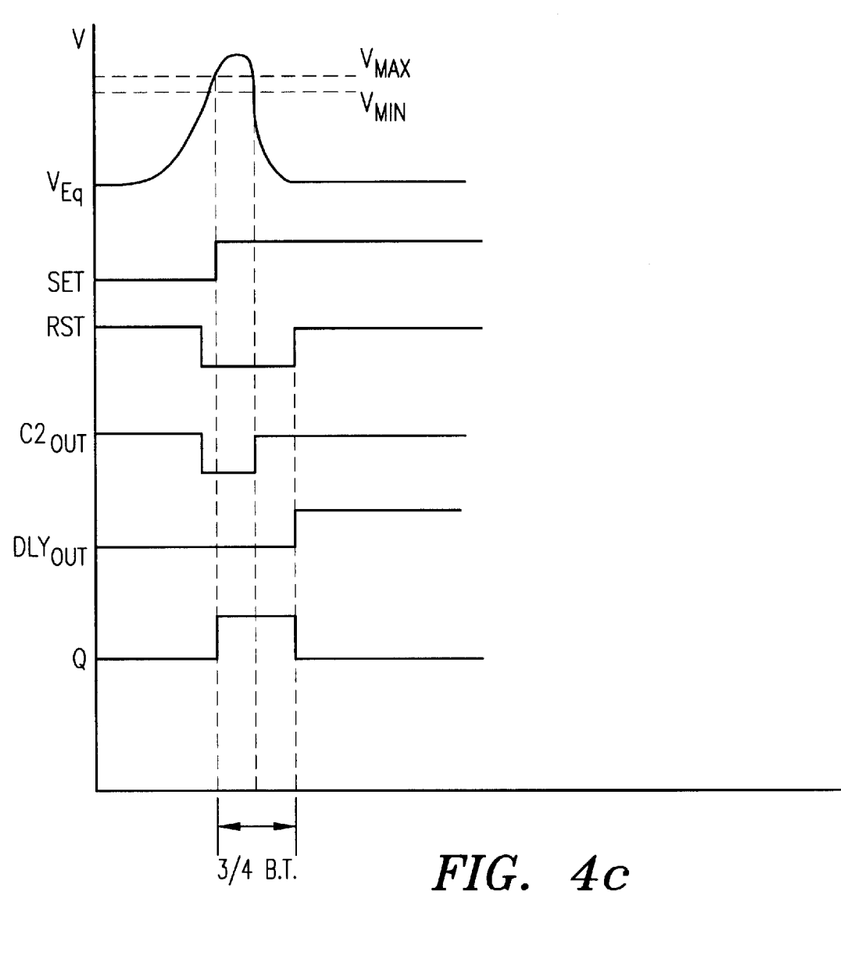
FIG. 4(c) is a timing diagram illustrating a pulse extension operation performed by a positive/negative pulse slicer in accordance with the present invention.

Turning now to FIGS. 4(a)–(c), the slicer blocks 16 and 18 (shown in FIG. 2) each comprise a pair of current mirror differential amplifier comparator circuits C1 and C2 having a wide common mode input range, and a SR latch 40 which provides programmable hysterisis. The inputs to each slicer block 16 or 18 comprise the equalized voltage signal $V_{Eq}$ and a pair of threshold reference voltages Vmax and Vmin. The threshold reference voltages Vmax and Vmin are supplied as a differential DC voltage.

Turning now to FIG. 4(b), the general function of the slicer blocks 16 and 18 may be described as follows. Where a positive value is sensed by the positive slicer block 16, the input voltage $V_{Eq}$ will rise until it crosses the first threshold voltage Vmax. At that point, the output of the comparator C1 will attain a high value, setting the SR latch 40, and the output Q of the SR latch 40 will be set high. So long as the input voltage $V_{Eq}$ remains above the second threshold voltage Vmin, the output of the SR latch 40 will remain high. However, once the input voltage $V_{Eq}$ drops below the second threshold voltage Vmin, the output of the second comparator C2 will attain a high value, resetting the SR latch 40, and the output Q of the SR latch 40 will be reset to a low value (i.e., zero). The negative slicer block 18 functions in a similar manner except, in the case of the negative slicer block 18, maximum and minimum negative threshold voltages are used for reference values, and the output of the SR latch comprises a negative maximum value (i.e., "–1") or zero.

Turning now to FIG. 4(c), in some instances it may be necessary to insure that the SR latch 40 is not reset by short or "runt" pulses. For this reason, an AND gate 42 is provided between the output of the second comparator C2 of each slicer block 16 or 18 and the reset pad R of the SR latch 40. The inputs to the AND gate 42 comprise the output of the second comparator C2 and a delay signal. In one preferred embodiment, the delay signal will achieve a high level at some predetermined time after the output Q of the SR latch 40 becomes high. The predetermined delay is preferably ¾ of the duration of a typical bit time or transmitted bit pulse width. However, those skilled in the art will appreciate that, depending upon the specifications for a given network, the delay may be varied. The function of the delay element 44 may be viewed as a pulse extension function that insures that short or "runt" pulses are not propagated through the system.

Implementation of the Delay Lines

Figure 5:
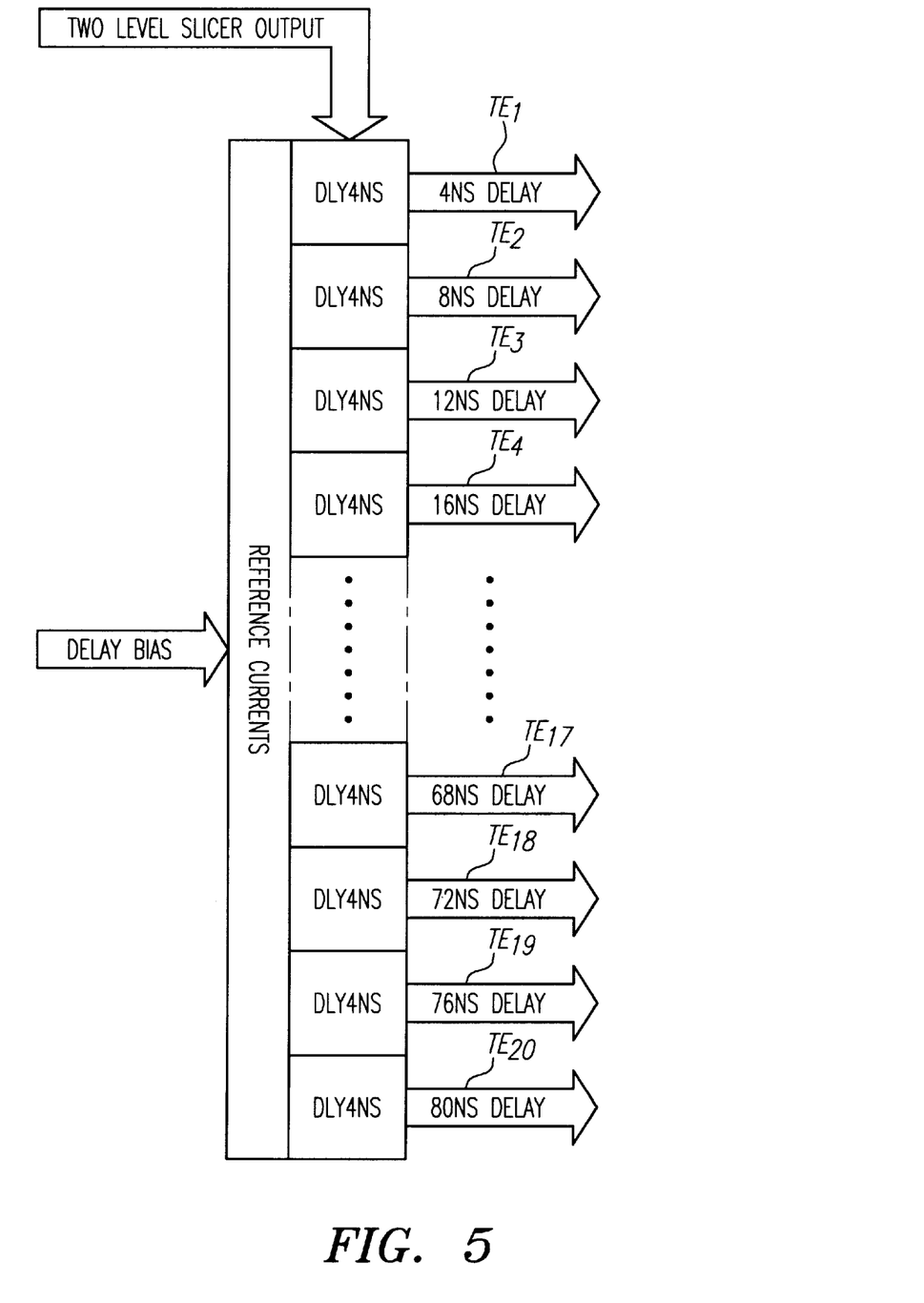
FIG. 5 is a block diagram illustrating the function of a delay line in accordance with the present invention.
Figure 6A:
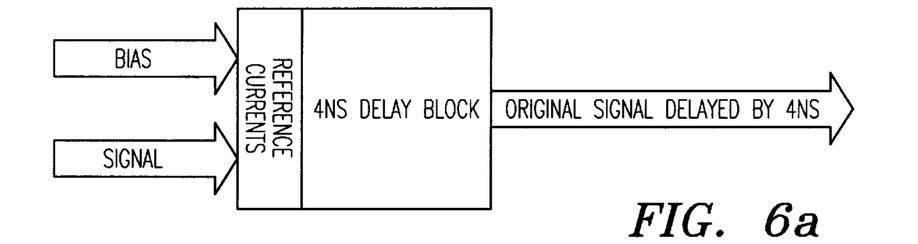
FIG. 6(a) is a block diagram illustrating the function of a delay cell in accordance with the present invention.
Figure 6B:
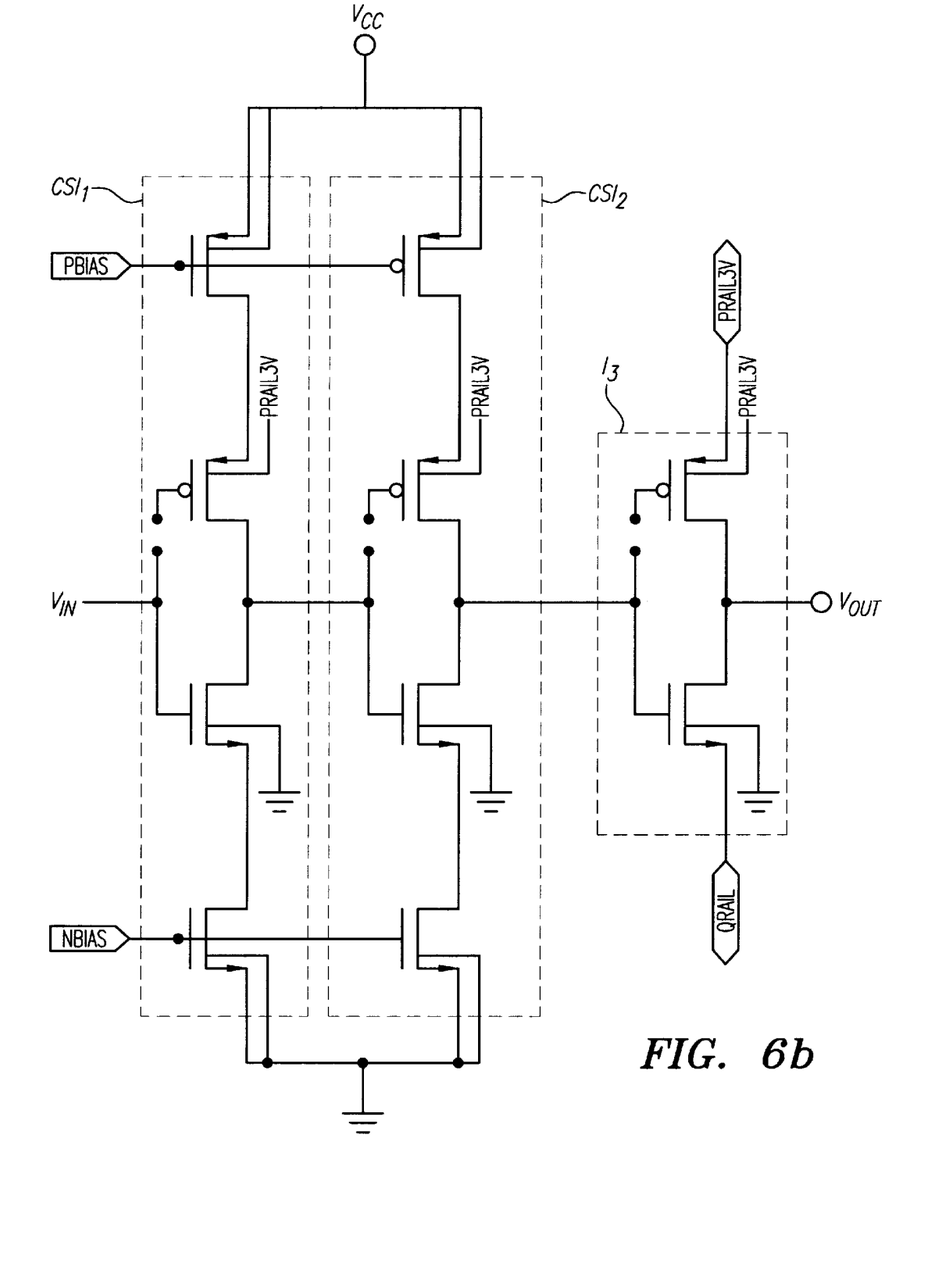
FIG. 6(b) is a circuit diagram of a delay element in accordance with a preferred form of the present invention.

Turning now to FIGS. 5, 6(a) and 6(b), the delay lines 20 and 22 take logic signals as their inputs and produce a series of delayed tap enable signals $TE_1$–$TE_{20}$, preferably at 4 ns intervals. The delay lines 20 and 22 are preferably implemented using delay elements that consist of two (2) symmetric push pull current starved inverters CSI1 and CSI2 followed by a third inverter 13 with no current or delay control. This structure is illustrated in FIG. 6(b). The current starved inverters CSI1 and CSI2 derive their bias from a precision phase locked loop (PLL) process tuning block that is locked to a fixed reference clock and adjusts its bias such that it is process and temperature compensated.

The configuration of the delay lines 20 and 22 is important in that it provides minimal pulse shrinkage at the end of twenty (20) like delay elements. Those skilled in the art will appreciate that delay is a function of the charge and discharge time of output capacitances. Thus, any delay element will inevitably change or alter the edge characteristics of an input pulse. In short, the delay element retards or slows down the rising edge of the input pulse in order to generate a delayed version of the input pulse. The trailing edge of an input pulse is likewise affected. Thus, those skilled in the art will appreciate that, when ignored, pulse edge degradation induced by delay elements will often result in substantial pulse width degradation of the input pulse.

The configuration of the delay lines 20 and 22 utilized in accordance with a preferred form of the present invention, is unique in that it allows for pulses with small widths to be delayed precisely and accurately as they pass through the delay line. This is achieved by inserting a high gain, high bandwidth amplifying element (13) after two current controlled delay elements (CSI1 and CSI2). The amplifying element (inverter 13) comprises a CMOS inverter and receives an incoming delayed pulse and, effectively, sharpens the edges of the received pulse, such that the received pulse retains its original pulse width to the first order. This also assists in preserving the pulse width of each pulse to be delivered to successive delay elements, thus minimizing pulse width degradation within the delay lines 20 and 22.

Implementation of the Adaptation Block

Figure 7:
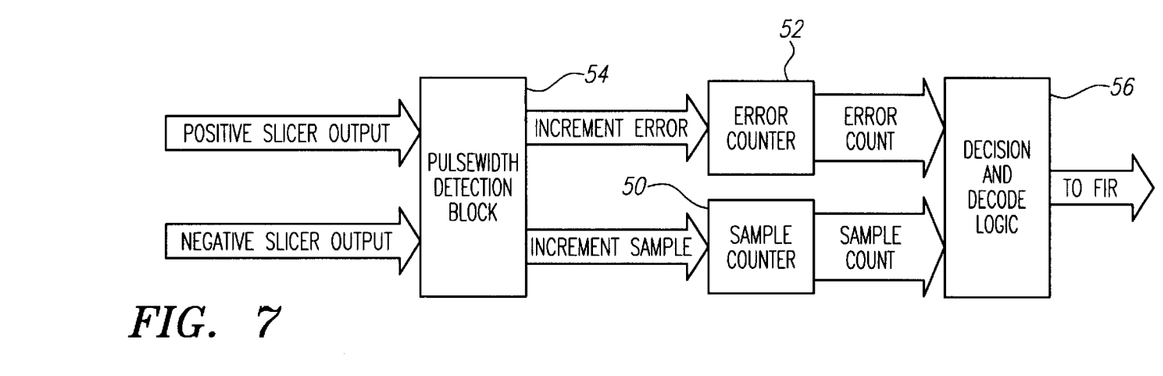
FIG. 7 is a block diagram illustrating the components and function of an adaptation circuit in accordance with the present invention.
Figure 8:
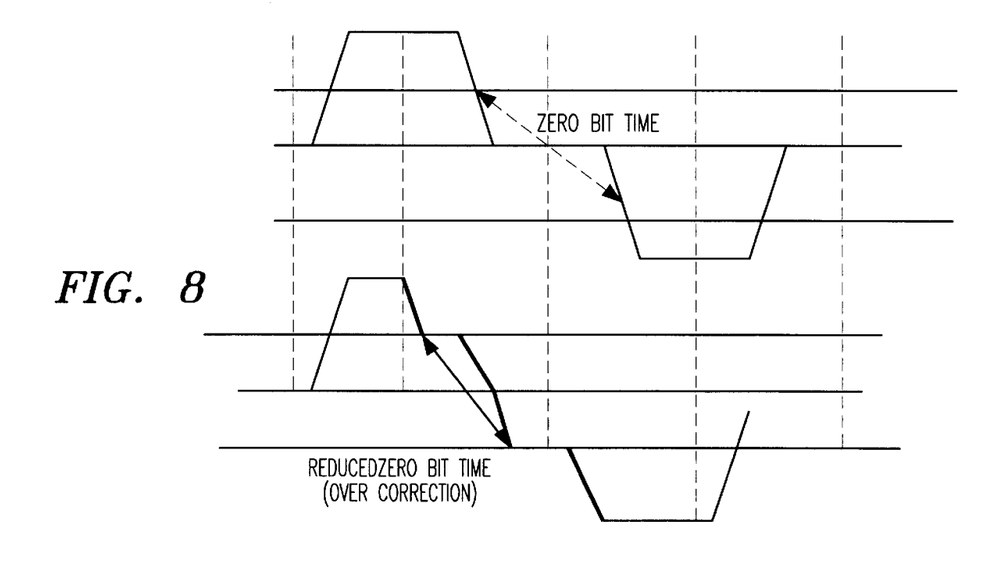
FIG. 8 is a timing diagram showing a corrected MLT-3 signal and an over-corrected MLT-3 signal.

Turning now to FIGS. 7 and 8, the cable adaptation block uses the duration of the zero level in a 1,0,–1 MLT-3 (Multi-level Transition or three level transition) pattern to determine any amount of over-correction being applied to the received voltage input signal Vin and, subsequently, to determine an appropriate equalizer cable setting.

Overcorrecting occurs if the equalizer setting subtracts more ISI than that which is inherently present in the tail of a pulse. Moreover, over-subtraction results in a narrowing of the pulse widths of the equalized voltage waveform $V_{Eq}$, and also shortens the time between pulses. Those skilled in the art will appreciate that the time between pulses corresponds to the duration of the "0" symbol in a MLT-3 pattern. Those skilled in the art will also appreciate that, in an ideal situation, a +1 , 0 and –1 symbol will have equal pulse widths. Overcorrecting significantly reduces the "0" symbol time because it tends to subtract a larger amount of ISI from the "1" pulse and thus pulls in the "–1 "pulse closer to the "1" pulse. The phenomenon is illustrated using an ideal 1, 0, –1 pulse and subtracting away the appropriate ISI for the sequence.

The adaptation process is a linear search that iterates through the various cable settings, for example, from longest (maximum equalization) to shortest (minimum equalization), until it finds the appropriate setting. During each iteration the adaptation block looks at a predetermined number of 1, 0, −1 MLT-3 patterns constituting the sample space and determines the number of samples that contain an acceptable minimum duration of the zero level. If the ratio of the number of acceptable samples to the total number of samples is greater than a certain threshold, the current setting is considered acceptable and no further steps are taken, otherwise the adaptation block moves to the next setting and repeats the process.

In an exemplary embodiment, the above algorithm may be implemented using two counters 50 and 52, a pulse detection block 54, and decision and decoding logic 56. The two counters 50 and 52 keep track of the number of samples and the number of the unacceptable samples, respectively. The pulse detection block 54 determines the duration of the zero level of each sample and generates an output signal incrementing the counter 52 each time an unacceptable duration is determined. Counting the number of unacceptable samples ensures faster convergence of the algorithm because it is possible to move to the next iteration as soon as the count of unacceptable samples reaches a value that would cause the prescribed ratio to drop below a predetermined threshold level. For example, if the threshold is set at eighty percent (80%) and the sample space is set to be one hundred (100), it is possible to move to the next setting as soon as the unacceptable samples counter reaches twenty one (21).

Implementation of the Baseline Wander Correction Block

Figure 9:
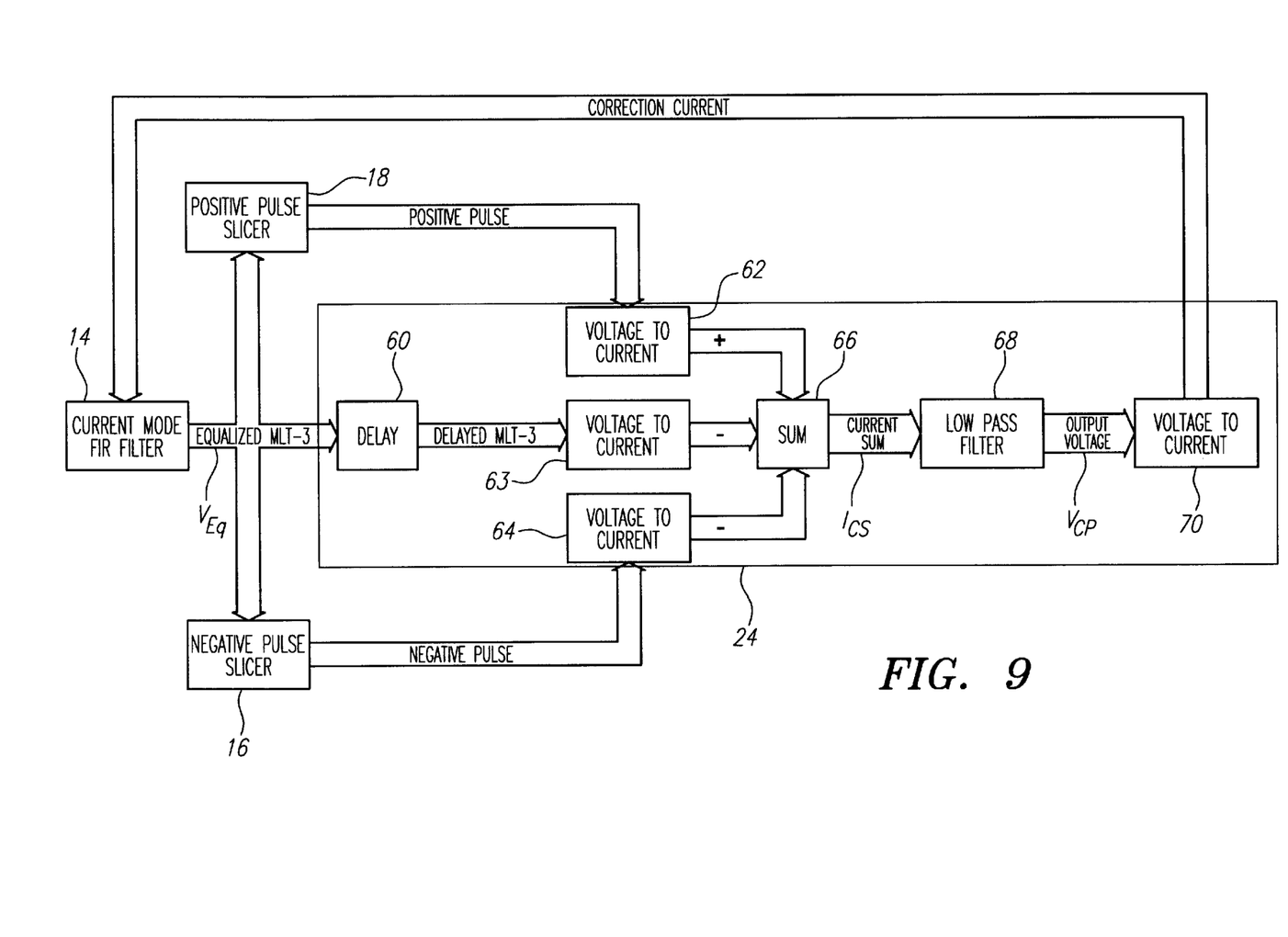
FIG. 9 is a block diagram of a baseline wander correction circuit in accordance with the present invention.

Turning now to FIG. 9, those skilled in the art will appreciate that inductance associated with far end transmitter transformers and near end receiver transformers often causes long data pulse voltages to droop, effectively distorting the data signal. Over time, the droop can accumulate, increasing the distortion to such an extent that the bit error rate of the receiver becomes unacceptably high. This distortion is termed baseline wander.

The rate at which baseline wander accumulates is dependent upon the data pattern, the amount of inductance in the transformers, and the resistance seen at the terminals of the transformers. Although the tolerance of the values for inductance and resistance can vary from system to system, they are fairly constant and slow to change in any particular system. The data pattern, however, is neither fixed nor predictable, and will thus determine when the baseline wander increases most quickly.

Minimal baseline wander is observed for high frequency DC balanced patterns comprising a maximal time density of short voltage pulses for two primary reasons: (1) because minimal time is allowed for droop to accumulate for each pulse, and (2) because droops associated with proximate positive and negative pulses will cancel out, leaving minimal distortion behind. Maximal baseline wander is observed for low frequency patterns which are not DC balanced for exactly the opposite reasons.

In accordance with the present invention, however, a data signal may be passed through a set of slicers to convert the stream into a discrete level trinary stream. This discrete level trinary signal, which has no inherent baseline wander regardless of data pattern, will comprise a crisper version of the output of the FIR filter 14 as long as the baseline wander in the equalized signal is not so great as to cause quantization errors. In the absence of baseline wander, the time averaged values of the two signals should be the same. Therefore, the difference in the average value of the level trinary stream (no baseline wander) from the average value of the output of the FIR filter 14 (inherent baseline wander) is a measure of the accumulated baseline wander at the output of the FIR filter 14. A correction signal may, therefore, be added in accordance with the present invention to the output of the FIR filter 14 to remove the baseline wander. When the average values of the level trinary stream and the FIR filter 14 output are equal, there is no baseline wander in the data stream. Where the average values are not equal, a correction signal is placed in negative feedback to the FIR filter to remove the baseline wander distortion from the data signal.

The baseline wander correction block is implemented using a stream of high frequency DC balanced data at the output of the FIR filter 14 and under such conditions that the inherent uncorrected baseline wander is sufficiently negligible to cause quantization errors in the discrete level trinary signal.

As shown in FIG. 9, the actual implementation is achieved primarily in the current mode. In a preferred form, the baseline wander correction block 24 comprises a delay element 60; first, second and third transconductors (voltage-to-current converters) 62–64, a summing element 66, a low pass filter 68 and a fourth transconductor (voltage-to-current converter) 70.

A discrete level trinary data signal is constructed by summing a current derived from a positive pulse (+1) output by the positive slicer block 16, a current derived from a negative pulse (−1) output by the negative slicer block 18, and a delayed current derived from the equalized voltage signal $V_{Eq}$ (or equalized MLT-3 signal) as indicated in the diagram The resultant current sum $I_{CS}$ is passed to a low pass filter 62, and the output voltage $V_{LP}$ of the low pass filter 62 is again converted to a correction current Ic and provided to the FIR filter 14, thereby completing the negative feedback loop. The delay element 60 between the FIR filter 14 and the transconductor (voltage-to-current converter) 63 preferably matches the inherent delays of the equalized voltage signal $V_{Eq}$, as that signal passes through the positive pulse slicer 16 and the negative pulse slicer 18. The low pass filter 68 performs the averaging function described above. Preferably, only one low pass filter is used to implement the averaging function in order to reduce the amount of circuitry utilized for, in this case, the sum of averages is the same as the average of the sum. Although this implementation is targeted towards a particular system/coding scheme, those skilled in the art will appreciate that the concepts described herein are extensible to other multilevel coding schemes and systems. Thus, the particular coding scheme employed should not in any way be considered a limitation on the invention described and claimed herein.

The transconductors (voltage-to-current converters) 62–64 and 70 preferably are tuned against process variation through the use of a process bias current received from a process compensation circuit within the FIR filter circuit block 14. The delay element's precision across process corners is achieved through the use of a tuning current received from the process tuning phase-locked loop (PLL) 30.

Implementation of the Process Tuning Phase-Lock-Loop (PLL)

The process tuning phase-locked loop (PLL) 30 is locked to a precision frequency reference. The output of the PLL 30 is a clock that has a frequency exactly equal to the input. The PLL 30 preferably will adjust its voltage controlled oscillator (VCO) (not shown) such that the frequency of the VCO exactly matches that of the reference.

The PLL 30 is implemented using a conventional digital phase detector, precision charge pump, passive loop filter and a voltage controlled oscillator (VCO). None of these elements are shown in the drawings because it is believed that those skilled in the art will readily understand the structure and function of the PLL 30. The VCO is a ring oscillator that is constructed with cells that are replicas of the various delay elements in the delay lines 20 and 22. The delay through the ring, and subsequently, the frequency of the oscillator is thus a function of the current through each delay element. The negative feedback within the PLL 30 constantly ensures that the delay through each element is tuned such that the frequency of the oscillator is fixed. The current through the delay cells is replicated and transferred to the various delay elements in the decision feedback equalizer 10, ensuring that their delay is independent of temperature and process variations.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A decision feedback equalizer circuit comprising:

a voltage-to-current converter for receiving a voltage input signal and converting said voltage input signal to a current input signal;

a current mode finite impulse response filter coupled to said voltage-to-current converter for adding positive and negative current increments to said current input signal at selected times to produce an equalized current signal;

a positive slicer block coupled to said current mode finite impulse response filter for detecting when said equalized current signal achieves a positive threshold current level and, upon such detection, providing via a first delay line a plurality of negative tap enable signals at a plurality of predetermined delay times to said current mode finite impulse response filter;

a negative slicer block coupled to said current mode finite impulse response filter for detecting when said equalized current signal achieves a negative threshold current level and, upon such detection, providing via a second delay line a plurality of positive tap enable signals at a plurality of predetermined delay times to said current mode finite impulse response filter; and a current-to-voltage converter coupled to said current mode finite impulse response filter for converting said equalized current signal to an equalized voltage signal.

2. The decision feedback equalizer circuit of claim 1 further comprising an attenuator circuit for scaling said voltage input signal prior to its receipt by said voltage-to-current converter.

3. The decision feedback equalizer circuit of claim 1 further comprising an adaptation circuit for activating and deactivating positive and negative tap enable signal generators such that said equalized voltage signal conforms to a proper configuration.

4. The decision feedback equalizer circuit of claim 1 further comprising a baseline wander correction circuit for providing a correction current to said current mode finite impulse response filter to compensate for baseline wander in said input voltage signal.

5. A decision feedback equalizer circuit for removing intersymbol interference from a received signal having pulse widths equal to or less than ten nanoseconds, said decision feedback equalizer circuit comprising:

means for converting said received signal to an input current signal;

means for adding positive and negative current increments to said input current signal to create an equalized current signal; and means for converting said equalized current signal to an equalized voltage signal.

6. The decision feedback equalizer circuit of claim 5, wherein said means for adding and subtracting current increments from said input current signal comprises:

means for determining when said equalized voltage signal achieves positive and negative threshold values and for generating respective positive and negative indicator signals upon said detection;

means for generating, respectively, a programmably determinable number and sequence of enabling signals in response to said respective positive and negative indicator signals;

means for generating said positive and negative current increments in response to said enabling signals.

7. The decision feedback equalizer circuit of claim 6, wherein said means for generating said positive and negative current increments comprises a current mode finite impulse response (FIR) filter;

said means for determining when said equalized voltage signal achieves positive and negative threshold values comprises a positive slicer circuit and a negative slicer circuit; and said means for generating, respectively, a programmably determinable number and sequence of enabling signals comprises a plurality of delay line elements.

8. The decision feedback equalizer circuit of claim 7, wherein each said delay line element comprises a pair of symmetric push pull current starved inverters coupled to a third inverter with no current or delay control.

9. The decision feedback equalizer circuit of claim 7, wherein said positive and negative slicer circuits each comprise a first comparator circuit, a second comparator circuit, a SR latch circuit, a delay element and an AND gate, said first and second comparator circuits each having an input for receiving said equalized voltage signal, said first comparator circuit having a second input for receiving a maximum threshold voltage and an output coupled to a SET pad of said SR latch, said second;

said second comparator circuit having a second input for receiving a minimum threshold voltage and an output coupled to a first input of said AND gate, said delay element having an input coupled to a Q output pad of said SR latch and having an output coupled to a second input of said AND gate; and said AND gate having an output coupled to a RST pad of said SR latch.

10. The decision feedback equalizer circuit of claim 5 further comprising means for removing baseline wander from said equalized current signal.

11. A decision feedback equalizer circuit for removing intersymbol interference from a received signal having pulse widths less than or equal to ten nanoseconds, said decision feedback equalizer circuit comprising:

a first transconductor for converting said received signal to an input current signal;

a current mode finite impulse response filter network for adding positive and negative current increments to said input current signal to remove said intersymbol interference from said input current signal, thereby converting said input current signal to an equalized current signal; and a second transconductor for converting said equalized current signal to an equalized voltage signal.

12. The decision feedback equalizer circuit of claim 11, wherein said finite impulse response filter network comprises:

a current mode finite impulse response filter including a plurality of quantized differential current sources for adding said positive and negative current increments to said input current signal;

a positive/negative slicer network for determining when said equalized voltage signal achieves predetermined positive and negative, maximum and minimum threshold levels and for generating indicator signals upon each such determination; and a delay network coupled to said positive/negative slicer network and to said current mode finite impulse response filter for delivering a predetermined number and sequence of enabling signals to said quantized differential current sources of said current mode finite impulse response filter in response to receiving said indicator signals from said positive/negative slicer network.

13. The decision feedback equalizer circuit of claim 12, wherein said finite impulse response filter network further comprises a feedback network for eliminating baseline wander from said equalized current signal.

14. The decision feedback equalizer circuit of claim 12, wherein said finite impulse response filter network further comprises an attenuator circuit for scaling said received signal prior to a delivery of said received signal to said first transconductor.

15. A method for equalization of very high frequency multi-level and baseband codes, said method comprising:

providing an input voltage signal to a first transconductor to produce an input current signal;

providing said input current signal to a current mode finite impulse response filter, said current mode finite impulse response filter being configured to add positive and negative incremental currents to said input current in a programmably controllable manner to produce an equalized current signal; and providing said equalized current signal to a second transconductor to produce an equalized voltage signal.

16. The method of claim 15 further comprising scaling said input voltage signal prior to providing said input voltage signal to said first transconductor.

17. The method of claim 15 further comprising:

detecting when said equalized current signal achieves positive and negative current threshold levels and providing a plurality of delayed tap enable signals to said current mode finite impulse response filter in a programmably controlled sequence when said positive and negative current threshold levels are detected.

18. A method of filtering intersymbol interference in signal processing systems, said method comprising:

receiving an input voltage signal having pulse widths less than or equal to ten nanoseconds;

converting said input voltage signal to an input current signal;

adding positive and negative current increments to said input current signal to produce an equalized current signal; and converting said equalized current signal to an equalized voltage signal.

19. The method of claim 18, wherein said adding positive and negative current increments to said input current signal is effected using a plurality of quantized differential current sources.

20. The method of claim 18, wherein said adding positive and negative current increments includes:

monitoring said equalized current signal to determine when said equalized current signal achieves positive and negative threshold levels; and generating in response to said equalized current signal achieving said positive and negative threshold levels a plurality of tap enable signals for controlling the addition of said positive and negative current increments to said input current signal.

21. The method of claim 20, wherein a number of said tap enable signals generated in response to said equalized current signal achieving either a positive or a negative threshold is programmably variable, and wherein a period between said tap enable signals is programmably variable.

22. The method of claim 21, wherein said equalized voltage signal is monitored to determine whether said equalized voltage signal conforms to a predetermined signal definition, and wherein said number of tap enable signals is varied when said equalized voltage signal does not conform to said predetermined signal definition.

23. The method of claim 22, wherein said variation of said number of tap enable signals is performed by setting said number of tap enable signals to a predetermined maximum number and reducing said number of tap enable signals incrementally over a predetermined period of time until said equalized voltage signal conforms to said predetermined signal definition.

* * * * *